United States Patent [19]
Rosen

[11] Patent Number: 6,131,986
[45] Date of Patent: Oct. 17, 2000

[54] SUN VISOR ASSEMBLY WITH FINGER-OPERABLE PIVOT LOCK

[75] Inventor: John B. Rosen, Eugene, Oreg.

[73] Assignee: Rosen Products LLC, Eugene, Oreg.

[21] Appl. No.: 08/932,455

[22] Filed: Sep. 18, 1997

[51] Int. Cl.[7] ...................................................... B60J 1/02
[52] U.S. Cl. ..................................... 296/97.13; 296/97.12
[58] Field of Search ............................... 296/97.4, 97.12, 296/97.13

[56] References Cited

U.S. PATENT DOCUMENTS

| | | | |
|---|---|---|---|
| 390,790 | 10/1888 | Luce | 296/97.12 |
| 1,275,311 | 8/1918 | Schumacher et al. | 296/97.12 |
| 1,780,400 | 11/1930 | Nelson | 296/97.12 |
| 4,176,875 | 12/1979 | Dow . | |
| 4,428,612 | 1/1984 | Viertel et al. . | |
| 4,469,367 | 9/1984 | Kuttler et al. . | |
| 4,854,629 | 8/1989 | Hagstrom . | |
| 5,011,212 | 4/1991 | Viertel et al. . | |
| 5,039,153 | 8/1991 | Lindberg et al. . | |
| 5,190,339 | 3/1993 | Ceideberg . | |
| 5,280,988 | 1/1994 | Gute . | |
| 5,366,265 | 11/1994 | Aymerich et al. . | |
| 5,454,617 | 10/1995 | Welter . | |
| 5,529,367 | 6/1996 | Van Order et al. . | |
| 5,556,155 | 9/1996 | Welter . | |
| 5,577,792 | 11/1996 | Muyres et al. . | |
| 5,600,869 | 2/1997 | Munoz . | |

*Primary Examiner*—Gary C. Hoge
*Attorney, Agent, or Firm*—Kolisch, Hartwell, Dickinson, McCormack & Heuser

[57] ABSTRACT

A sun visor system for use in a vehicle having a window is provided with a finger-operable swing arm. The system includes a mount attachable in the vehicle and a swing arm pivotally coupled to the mount. The swing arm, which provides two degrees of freedom for positioning a visor panel and the mount, which provides an additional two degrees of freedom, allows the visor to be disposed between a user and an unwanted light source. The finger-operable lock allows the user selectively to lock the swing arm, preventing the swing arm from pivoting, and to release the swing arm, permitting pivotal motion.

15 Claims, 3 Drawing Sheets

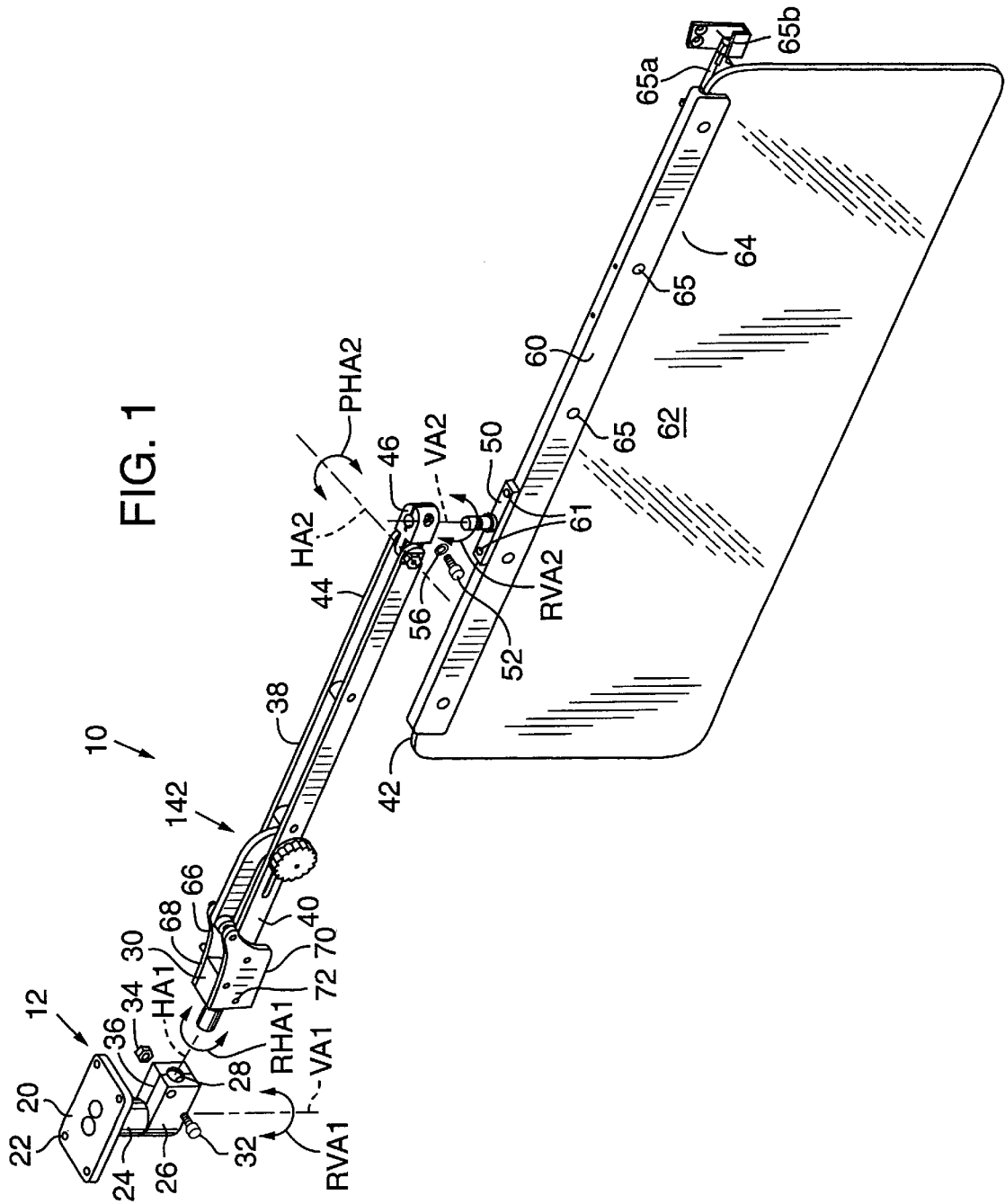

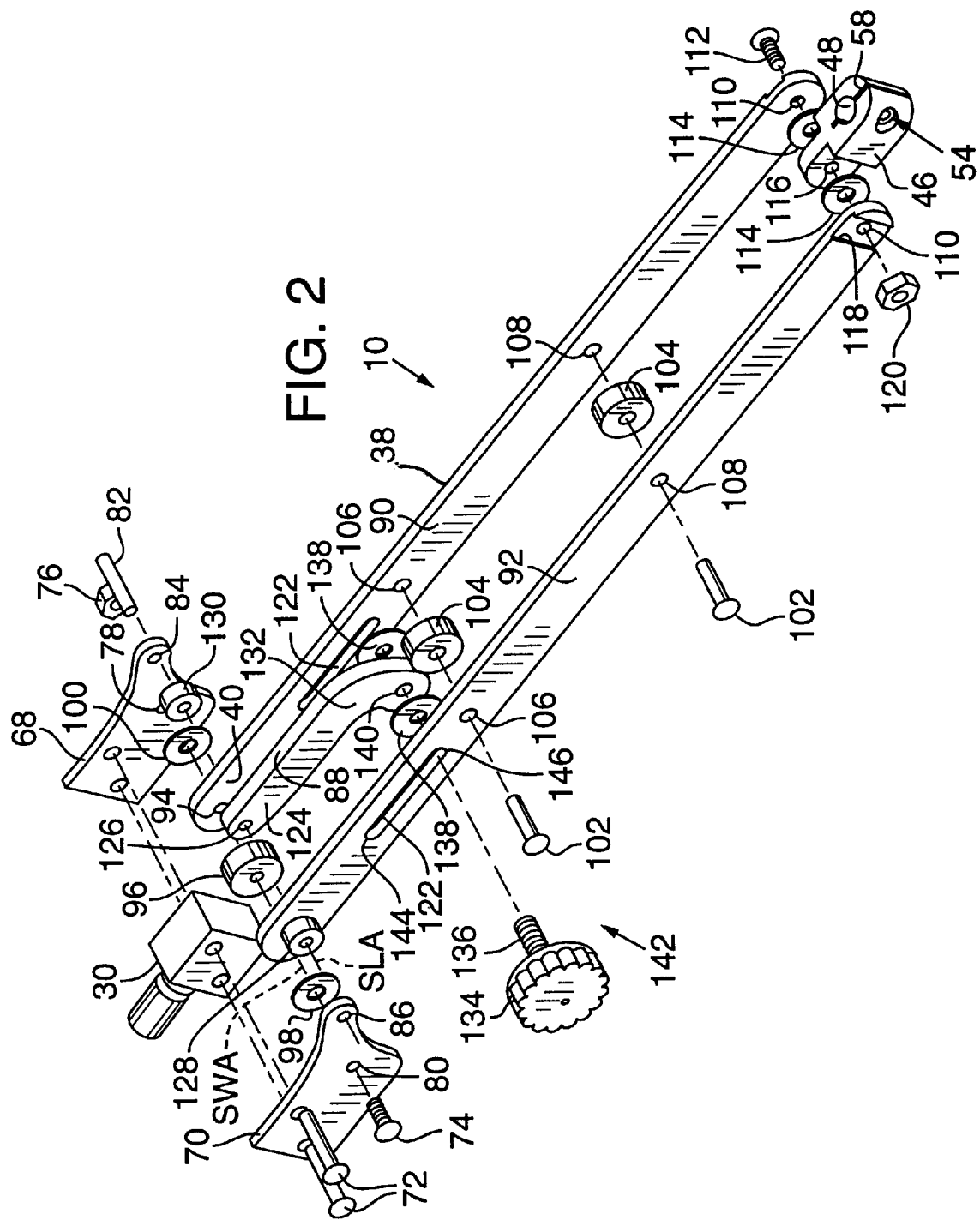

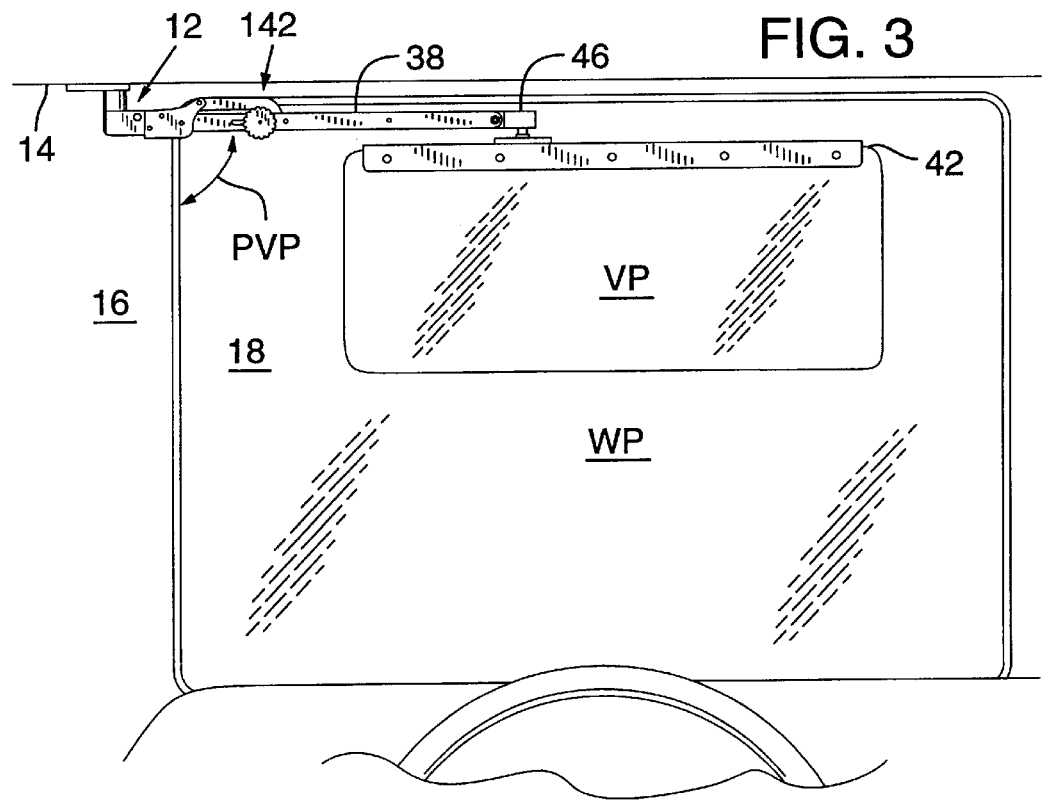
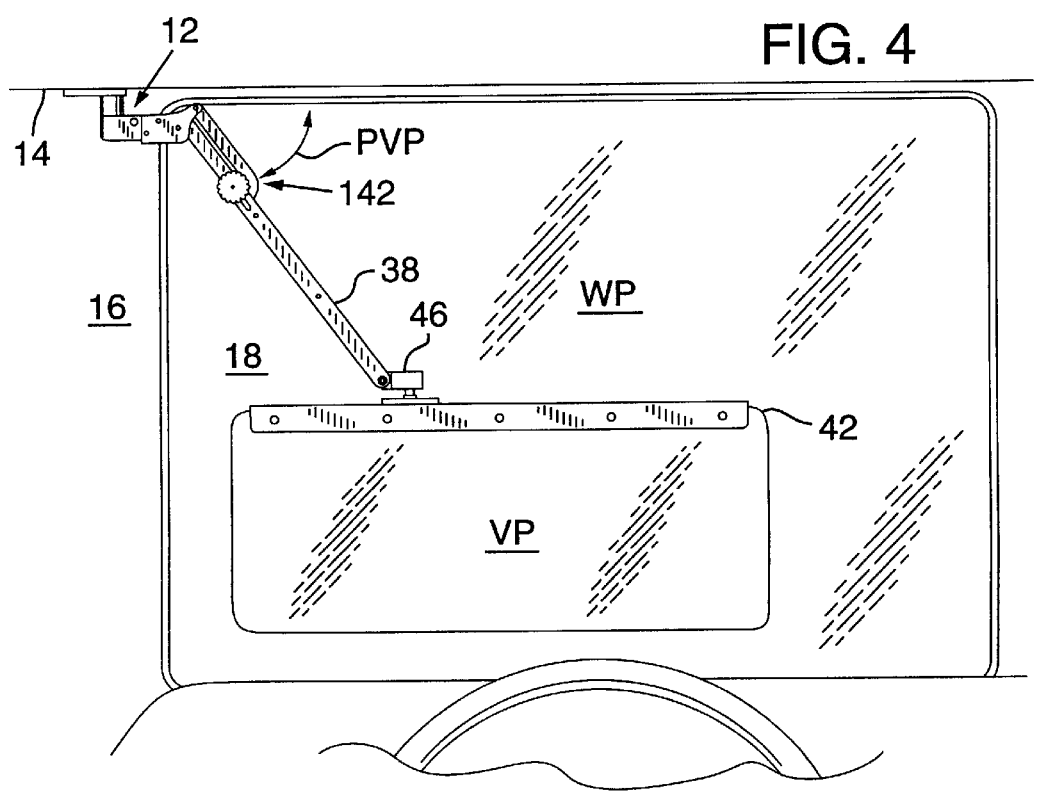

SUN VISOR ASSEMBLY WITH FINGER-OPERABLE PIVOT LOCK

BACKGROUND AND SUMMARY OF THE INVENTION

The present invention relates generally to sun visors installed adjacent one or more windows in cars, trucks, vans, or motor homes for filtering or blocking sunlight or glare coming in through the windows. More particularly, it concerns such a sun visor mounted on a swing arm which is nominally pivotal in a generally vertical plane with a finger-operable lock attached to the swing arm which a user can operate selectively to lock and release the swing arm to prevent or permit, respectively, pivoting of the swing arm in the generally vertical plane.

Applicant has made and sold a sun visor system for several years under the trademark, The Protector. This sun visor system, primarily for use in vehicles such as trucks and motor homes, includes a mount attachable to a wall or ceiling of the vehicle. The mount has a clevis with a pair of apertures for mounting an elongate arm which supports a transparent, tinted visor panel at a distal end. The visor panel may be positioned to hang in front of a windshield or a side window. The arm is pivotal in a generally vertical plane permitting a user to adjust the visor panel to a position higher or lower on the windshield or window as necessary to filter an unwanted source of light, such as direct sunlight, or reflected glare. The tension of the lock nut and bolt on the arm and clevis is set during manufacture of the sun visor, although, the user may subsequently readjust the tension with an Allen wrench and a socket wrench. The tension determines the ease with which the arm may be pivoted and the stability of the arm during travel. The mount and a coupling between the arm and the visor panel provide several additional degrees of freedom so the sun visor can be positioned to any position adjacent the windshield and window.

However, it would be desirable for the user to be able easily to adjust the tension holding the vertically pivoting arm. The user will want to tighten the tension on the arm as the vehicle is driven over rough or bumpy roads that may tend to jar the arm to an undesired position. On the other hand, the user under some conditions, such as hilly or winding roads where the source of undesired light is changing frequently, may need to reposition the visor panel often so that a loosened tension is better. Preferably, this readjustment of the tension can be performed by a driver of the vehicle quickly and easily while driving the vehicle. The tension of the pivot arm of the prior art device cannot be so adjusted because it requires a two-handed use of tools that must be fitted to the hardware for readjustment.

What would be preferable is a sun visor mounted on a swing arm with a finger-operable lock that the driver or a passenger can operate to lock and release the swing arm. The user would further be able to adjust the finger-operable lock so that the swing arm is very tightly held in place for rough, bumpy conditions and loosely held in place for easy repositioning during frequently changing light-source conditions. At the same time, the mount and coupling to the visor panel should provide several degrees of freedom for adjusting the position of the panel anywhere alongside the windshield and window.

The sun visor of the present invention provides all of these advantages and more. The mount includes an apertured plate, configured to be bolted to a wall or ceiling of a vehicle, and a clevis coupled to the plate by articulated joints that permit several degrees of freedom. The clevis includes two pairs of apertures, the pairs defining two axes which are offset from, and parallel to, one another. A swing arm is pivotally mounted at a proximal end to one of the pairs of apertures in the clevis and a visor panel is coupled at a distal end of the swing arm. The visor panel is coupled so as to permit additional degrees of freedom for positioning the visor panel. A slide arm is pivotally mounted at a proximal end to the other pair of clevis apertures. The slide arm is slidably held at a distal end in a slide channel in the swing arm by a bolt with a finger-operable knob which is threaded into a tapped hole in the slide arm. As the swing arm is pivoted in a generally vertical plane, the distal end of the slide arm slides relative to the swing arm in the slide channel. The finger-operable knob may be turned to tighten or loosen the engagement of the swing arm and the slide arm at the slide channel, thus selectively fixing the swing arm in place or allowing the swing arm to pivot freely.

A significant advantage of the sun visor of the present invention is that the user may adjust the swing arm so that the force required to pivot the swing arm is very large or very small. Furthermore, the user may do so easily, even while driving the vehicle, using only the fingers of one hand and without resort to tools.

These and additional objects and advantages of the present invention will be more readily understood after a consideration of the drawings and the detailed description of the preferred embodiment.

BRIEF DESCRIPTION OF THE INVENTION

FIG. 1 is a partially-exploded perspective view of the sun visor system of the present invention showing a mount, a swing arm with a visor coupled at one end, and a finger-operable pivot lock.

FIG. 2 is an exploded perspective view of the sun visor system of FIG. 1 showing a bracket, which forms part of the mount, the swing arm, and a slide arm and bolt which form the finger-operable pivot lock.

FIG. 3 is an elevation of the sun visor system of FIG. 1 installed in a vehicle adjacent a window with the swing arm pivoted up to the top of the window.

FIG. 4 is an elevation of the sun visor system of FIG. 1 with the swing arm pivoted down to the bottom of the window.

DETAILED DESCRIPTION OF THE PREFERRED EMBODIMENTS

Referring to the drawings, a sun visor system of the present invention is indicated generally at 10 in FIG. 1. The system includes a mount, generally indicated at 12, configured to be attached to a ceiling 14 or wall 16 of a vehicle adjacent a front window 18 of the vehicle as shown in FIGS. 3 and 4. As shown in FIG. 1, mount 12 includes a base, such as plate 20 with four mounting holes 22 through which bolts (not shown) can be installed for attachment to the vehicle. A vertically-oriented mounting pivot 24 is attached to base 20 and a pivot block 26 is pivotally coupled thereto. Pivot block 26 is rotatable about a first vertical axis VA1 as indicated by arrows RVA1. Pivot block 26 includes a socket 28 configured to mount a pivotal swing arm block 30 which is rotatable about a first horizontal axis HA1 as indicated by arrows RHA1. The tension with which block 30 is rotatably held within socket 28 is controlled by a bolt 32 and a lock nut 34 which are connected across an adjustment gap 36 in socket 28. Thus, two degrees of freedom for the sun visor system are provided by mount 12: rotation about first vertical axis VA1 allowing the system to be positioned closer or further from window 18 or moved to a side window (not shown); and rotation about first horizontal axis HA1 allowing the system to be flipped up to a storage position or moved into or out of a position parallel to a window.

The sun visor system includes a swing arm 38 pivotally coupled to mount 12 at a proximal end 40 of swing arm 38. A visor 42 is mounted at a distal end 44 of swing arm 38. As best seen in FIGS. 3 and 4, swing arm 38 and, thus, visor 42, are nominally pivotal, as indicated by arrows PVP, substantially in a generally vertical visor plane VP which is roughly parallel to a window plane WP generally defined by window 18. In the vehicle shown in FIGS. 3 and 4, window 18 is roughly vertical as is commonly seen in trucks and buses. Of course, for vehicles with windows slanted out of vertical, the sun visor can be rotated about first horizontal axis HA1, as desired, to accommodate such windows and it will be understood that generally vertical plane VP may be slanted out of vertical at least as much as 60° and is roughly parallel to the window plane when it is within at least about 60° of the window plane.

An end swing 46, which couples visor 42 to swing arm 38, allows the visor to pivot about a second horizontal axis HA2, as indicated by arrows PHA2. As best seen in FIGS. 3 and 4, this is advantageous for maintaining a constant orientation of visor 42 as it is pivoted in visor plane VP. End swing 46 includes a socket 48, best seen in FIG. 2 and similar to socket 28 in pivot block 26, configured to mount a visor support, such as end pivot 50 which allows visor 42 to be rotatable about a second vertical axis VA2 as indicated by arrows RVA2 in FIG. 1. The tension on support 50 for rotation about vertical axis VA2 is controlled by screw 52 which is mounted in a threaded hole 54 (FIG. 2) in end swing 46 across adjustment gap 58 with a lock washer 56 to prevent screw 52 from backing out. Thus, visor 42 is positionable with two more degrees of freedom about second horizontal axis HA2 and second vertical axis VA2 so that the visor can be disposed between a user and any unwanted or annoying source of light, such as the sun or glare from oncoming cars, coming from any direction.

Visor panel support 50 is coupled to an elongate brace 60, preferably by a pair of screws 61. Brace 60 holds a visor panel 62 at an upper edge 64 of the panel, preferably by five screws 65. Panel 62 is preferably formed of a tinted, transparent plastic material, such as ImpleX™ No. 2074 which is a dark gray-tinted plastic, or other material suitable for viewing of objects through the material but also providing a reduction in light intensity passing though the material. Alternatively, the material may be opaque to block light completely. In either case, the visor panel is operable to abate an annoying light source. Brace 60 includes a rod 65*a* at a distal end which can be placed in a support 65*b* configured to be bolted to vehicle ceiling 14 or wall 16.

As shown in FIG. 1, mount 12 further includes a bracket, such as clevis 66 which includes two matching plates 68, 70 attached by rivets 72 on opposite sides of block 30. As best seen in FIG. 2, clevis 66 includes a swing arm axle, such as screw 74 attached by lock nut 76, which is connected in collinear apertures 78 and 80 in plates 68 and 70 respectively, for pivotally coupling swing arm 38. Clevis 66 also includes a slide arm axle, such as dowel pin 82 which is press fitted into collinear apertures 84 and 86 in plates 68 and 70, respectively, for mounting a slide arm 88 adjacent swing arm 38. Swing arm axle 74 and slide arm axle 82 define offset and generally parallel axes SWA and SLA, respectively.

As shown in FIG. 2, swing arm 38 comprises two matching swing arm halves 90, 92. A first aperture 94 at proximal end 40 of each swing arm half (not shown for swing arm half 92) is configured to receive and be pivotally mounted on screw 74. A spacer 96 and two washers 98, 100 are also mounted on screw 74 to position swing arm halves 90, 92 and to allow them nominally to pivot in visor plane VP (FIGS. 3 & 4). Swing arm halves 90, 92 are further joined by two rivets 102 with two spacers 104 at second and third apertures 106 and 108. End swing 46 is pivotally coupled to a fourth aperture 110 in the swing arm halves by Allen screw 112 with washers 114 at aperture 116 in end swing 46. Swing arm half 92 includes a recessed groove 118 for holding a lock nut 120 against rotation to allow tightening of screw 112 without requiring a separate tool for lock nut 120. Swing arm halves 90 and 92 also each include an elongate slide channel 122.

Slide arm 88 has a proximal end 124 which includes an aperture 126 where the slide arm is pivotally coupled to slide arm axle 82 adjacent the swing arm. Two spacers 128 and 130 are also mounted on axle 82 on each side of the slide arm to position the slide arm so that a distal end 132 is disposed between the swing arm halves. Slide arm 88 is slidably coupled at distal end 132 to slide channel 122 of swing arm 38 by a knurled knob 134 with a bolt 136 extending therefrom. Bolt 136 extends through channel 122, two washers 138 and a threaded aperture 140 in slide arm 88.

Because swing arm 38 and slide arm 88 are pivotal on two generally parallel and offset axes, SWA and SLA, respectively, the act of pivoting swing arm 38 causes bolt 136 to move along slide channel 122. Knob 134 is configured to be turned by a user's hand to tighten bolt 136 in hole 140 which draws slide arm 88 toward swing arm half 92, tightening or clamping the slide arm against the swing arm half. Thus, knob 134, bolt 136, slider 88 together comprise a finger-operable swing arm lock or control, indicated generally at 142, coupled to swing arm 88 and configured to allow a user selectively to lock the swing arm, preventing the swing arm from pivoting in visor plane VP, and to release the swing arm, permitting the swing arm to pivot in visor plane VP. Swing arm lock 142 is infinitely adjustable by the user to vary the swing arm tension between a generally locked configuration and a generally released configuration and through variable tension in between.

As shown in FIG. 2, and further illustrated in FIGS. 3 and 4, slide channel 122 includes two stops, such as proximal end 144 and distal end 146, which limit the slidable coupling of slide arm 88 to swing arm 38. When swing arm 38 is positioned at an uppermost position, as shown in FIG. 3, bolt 136 is positioned against distal end 146 of channel 122, and swing arm 38 can move no higher. With swing arm 38 is pivoted in visor plane VP down to a lowermost position, as shown in FIG. 4, bolt 136 is positioned against proximal end 144 of channel 122, and swing arm 38 can move no lower.

While the present invention has been shown and described with reference to the foregoing preferred and alternate embodiments, it is to be understood by those skilled in the art that other changes in form and detail may be made therein without departing from the spirit and scope of the invention as defined in the appended claims.

I claim:

1. A sun visor system for use in a vehicle, the system comprising:
   a mount configured to be attached to the vehicle;
   a swing arm pivotally coupled to the mount, the swing arm being nominally pivotal about a swing arm axis substantially in a generally vertical plane;

a finger-operable swing arm lock coupled to the swing arm, the lock configured to operate on the swing arm adjacent the swing arm axis to allow a user selectively to lock the swing arm, preventing the swing arm from pivoting in the generally vertical plane, and to release the swing arm, permitting the swing arm to pivot in the generally vertical plane; and a visor coupled to the swing arm, the visor configured to be disposed between the user and an unwanted source of light.

2. The sun visor system of claim 1 wherein the mount includes a bracket for pivotally coupling the swing arm and further wherein the swing arm lock includes a slide arm having a proximal end and a distal end, the proximal end pivotally coupled to the bracket adjacent the swing arm and the distal end slidably coupled to the swing arm.

3. The sun visor system of claim 2 wherein the bracket includes a swing arm axle and a slide arm axle, the axles defining offset, generally parallel axes, the swing arm pivotally coupled to the swing arm axle and the slide arm pivotally coupled to the slide arm axle.

4. The sun visor system of claim 2 wherein the swing arm includes a slide channel and the slide arm is slidably coupled to the slide channel.

5. The sun visor system of claim 4 wherein the slide channel includes a stop limiting the slidable coupling of the slide arm to the swing arm.

6. The sun visor system of claim 4 wherein the swing arm lock further includes a knob with a bolt extending therefrom, the knob and bolt configured to clamp together selectively the slide arm and the swing arm to allow the user to lock and release the swing arm.

7. The sun visor system of claim 2 wherein the swing arm comprises two swing arm halves and at least a portion of the slide arm is disposed between the halves.

8. A sun visor system for use in a vehicle with a window, the system comprising:

a vehicle mount including a base and a bracket coupled to the base, the base attachable to the vehicle adjacent the window;

a swing arm having a proximal end and a distal end, the swing arm pivotally coupled adjacent the proximal end to the bracket for pivotal motion substantially in a plane roughly parallel to a plane defined by the window;

a slide arm having a proximal end and a distal end, the slide arm coupled adjacent its proximal end to the bracket, the slide arm slidably coupled adjacent its distal end to the swing arm between the proximal and distal ends of the swing arm, the slide arm including a control for selectively locking the slide arm to the swing arm; and a visor coupled to the swing arm, the visor configured to be disposed alongside the window to abate an annoying light source.

9. The sun visor system of claim 8 wherein the control is finger-operable.

10. The sun visor system of claim 9 wherein the control is a knob with a bolt extending therefrom, the knob and bolt configured to clamp the slide arm to the swing arm.

11. The sun visor system of claim 8 wherein the swing arm comprises two swing arm halves and at least a portion of the slide arm is disposed between the swing arm halves.

12. The sun visor system of claim 8 wherein the swing arm includes a slide channel and the slide arm is slidably coupled to the slide channel.

13. The sun visor system of claim 12 wherein the slide channel includes a stop limiting the slidable coupling of the slide arm.

14. The sun visor system of claim 8 wherein the bracket includes a swing arm axle and a slide arm axle, the axles defining offset, generally parallel axes, the swing arm pivotally coupled to the swing arm axle and the slide arm pivotally coupled to the slide arm axle so that pivoting the swing arm and the slide arm causes the distal end of the slide arm to slide along the swing arm.

15. In a sun visor system for use in a vehicle having a window, the system including a mount attachable in the vehicle, a swing arm pivotally coupled to the mount nominally to allow the swing arm to pivot about a swing arm axis generally in a visor plane roughly parallel to a plane defined by the window, and a visor coupled to the swing arm and configured to be disposed between a user and an unwanted light source, a lockable control for the swing arm comprising:

a finger-operable swing arm lock coupled to the swing arm, the lock configured to operate on the swing arm adjacent the swing arm axis to allow a user selectively to lock the swing arm, preventing the swing arm from pivoting in the visor plane, and to release the swing arm, permitting pivotal motion in the visor plane.

\* \* \* \* \*